(12) United States Patent
Manicke et al.

(10) Patent No.: US 7,507,309 B2
(45) Date of Patent: *Mar. 24, 2009

(54) FRICTION STIR WELDING OF METAL MATRIX COMPOSITES

(75) Inventors: Paul S. Manicke, West Chester, OH (US); Earl Helder, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 11/618,246

(22) Filed: Dec. 29, 2006

(65) Prior Publication Data

US 2008/0156846 A1 Jul. 3, 2008

(51) Int. Cl.
*B32B 37/00* (2006.01)
(52) U.S. Cl. .................................. 156/73.5; 228/112.1
(58) Field of Classification Search ................ 156/73.5, 156/73.6, 580, 580.2; 228/2.1, 2.3, 112.1, 228/114.5
See application file for complete search history.

(56) References Cited

U.S. PATENT DOCUMENTS 5,272,809 A 12/1993 Robertson et al.
6,648,206 B2 * 11/2003 Nelson et al. ............ 228/112.1
2006/0049234 A1 * 3/2006 Flak et al. ................ 228/112.1

* cited by examiner

*Primary Examiner*—James Sells
(74) *Attorney, Agent, or Firm*—Adams Intellectual Property Law, P.A.; William Scott Andes, Esq.

(57) ABSTRACT

A method of making a fiber-reinforced component includes: providing a first composite member having a metal matrix with reinforcing fibers distributed therein; providing a second composite member having a metal matrix with reinforcing fibers distributed therein; and joining the first member to the second member by friction stir welding along a predetermined joint path, such that an average volume fraction of the reinforcing fibers within the joint path is substantially the same as an average volume fraction thereof in the composite members before joining. A fiber-reinforced component includes: first and second members each having a metal matrix with reinforcing fibers distributed therein. The first member is bonded to the second member by a solid state bond along a predetermined joint path, such that an average volume fraction of the reinforcing fibers within the joint path is substantially the same as an average volume fraction thereof in remainder of the members.

6 Claims, 5 Drawing Sheets

FRICTION STIR WELDING OF METAL MATRIX COMPOSITES

BACKGROUND OF THE INVENTION

This invention relates generally to metal matrix components and more particularly bonding of such components by friction stir welding.

It is known in the prior art to construct composite materials using a metallic matrix with reinforcing fibers, hereinafter referred to as "metal matrix composites". These materials combine light weight and good strength. Typically, the reinforcing fibers are relatively short in length and are oriented randomly so that the component will have isotropic properties. Non-limiting examples of turbine engine components which may be constructed from such composites include rotating fan blades and other kinds of airfoils, rotating shafts and disks, static structures.

Metal matrix composites can be molded to desired shapes or can be bonded through means such as heat welding. Unfortunately, the fluid flow that occurs during the welding process disturbs this intended orientation and therefore undesirably creates an area along the joint in which only the matrix carries any loads placed on the component.

Accordingly, there is a need for joining metal matrix composites while maintaining their mechanical properties.

BRIEF SUMMARY OF THE INVENTION

The above-mentioned need is met by the present invention, which according to one aspect provides a method of making a fiber-reinforced component, including; providing a first composite member comprising a metal matrix with reinforcing fibers distributed therein in a selected orientation; providing a second composite member comprising a metal matrix with reinforcing fibers distributed therein in a selected orientation; and joining the first member to the second member by friction stir welding along a predetermined joint path, such that an average volume fraction of the reinforcing fibers within the joint path is substantially the same as an average volume fraction thereof in the composite members before joining.

According to another aspect of the invention, a fiber-reinforced component includes: a first composite member comprising a metal matrix with reinforcing fibers distributed therein in a selected orientation; and a second composite member comprising a metal matrix with reinforcing fibers distributed therein in a selected orientation; wherein the first member is bonded to the second member by a solid state bond along a predetermined joint path, such that an average volume fraction of the reinforcing fibers within the joint path is substantially the same as an average volume fraction thereof in remainder of the members.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
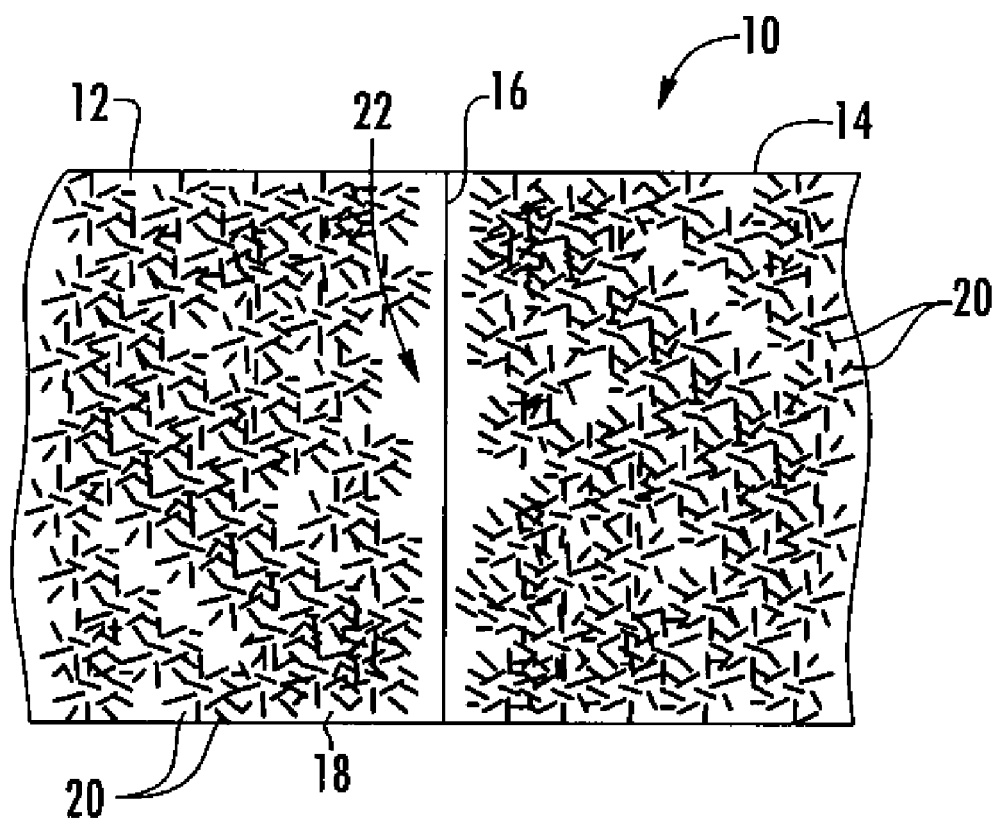
FIG. 1 is top plan view of a prior art component comprising two thermally bonded members.

Referring to the drawings wherein identical reference numerals denote the same elements throughout the various views, FIG. 1 depicts an exemplary prior art reinforced metal matrix component 10 comprising first and second members 12 and 14 bonded together along a joint path 16. The members 12 and 14 are both made from a composite material comprising a metal polymeric matrix 18 with reinforcing fibers 20 disposed therein. In the illustrated example the reinforcing fibers 20 have a random three-dimensional orientation to impart isotropic structural properties to the members 12 and 14. It should be noted that the fibers 20 are depicted in highly exaggerated scale for the purpose of illustration. The members 12 and 14 are bonded together using a conventional process such as thermal welding wherein the matrix 18 of each member 12 and 14 is heated along the joint, to a temperature above its solidus point, so that it will melt and flow together. The members 12 and 14 are then allowed to cool to form the unitary component 10. Unfortunately, the thermal welding process creates a heat-affected zone 22 within which the reinforcing fibers 20 are absent or disturbed in their density of distribution, or orientation. Under these circumstances, the area around the joint path 16 lacks the full strength that would be expected from the use of the reinforcing fibers 20.

Figure 2:
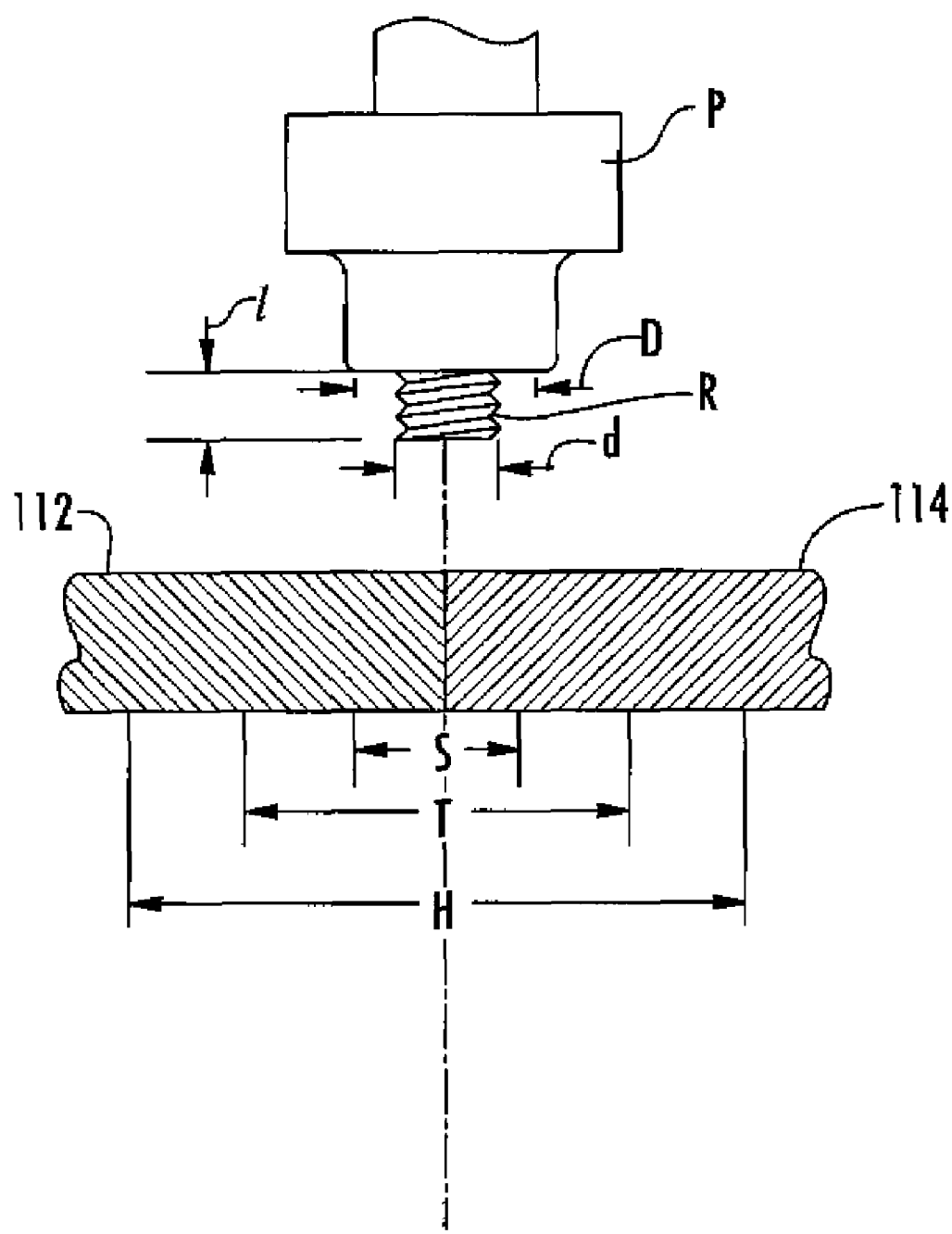
FIG. 2 is a side view of two members to be joined using a friction stir welding process.
Figure 3:
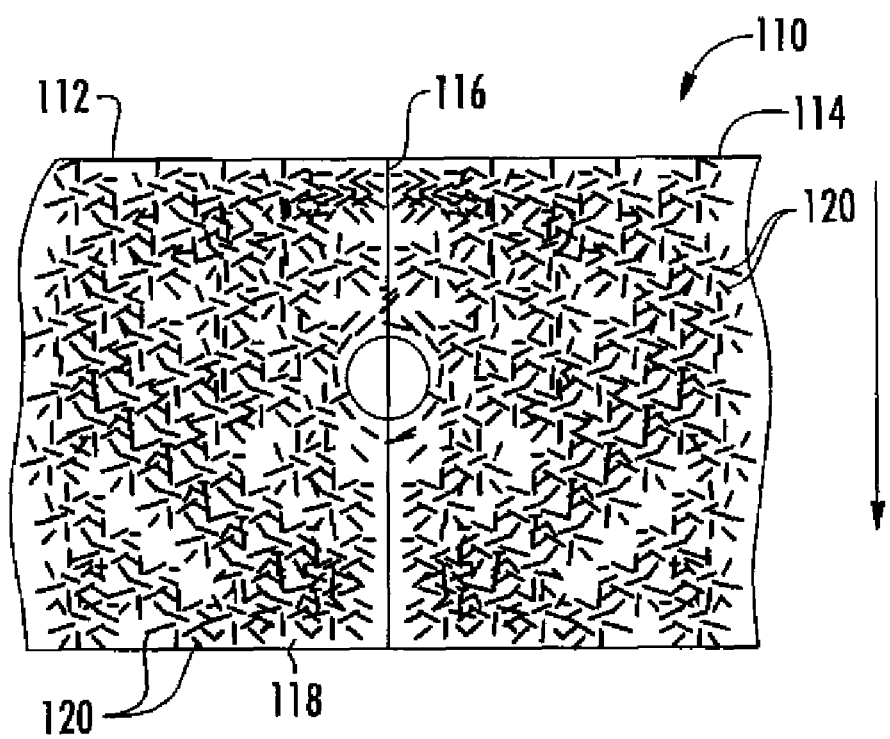
FIG. 3 is a top view of two members being joined with a friction stir welding process.
Figure 4:
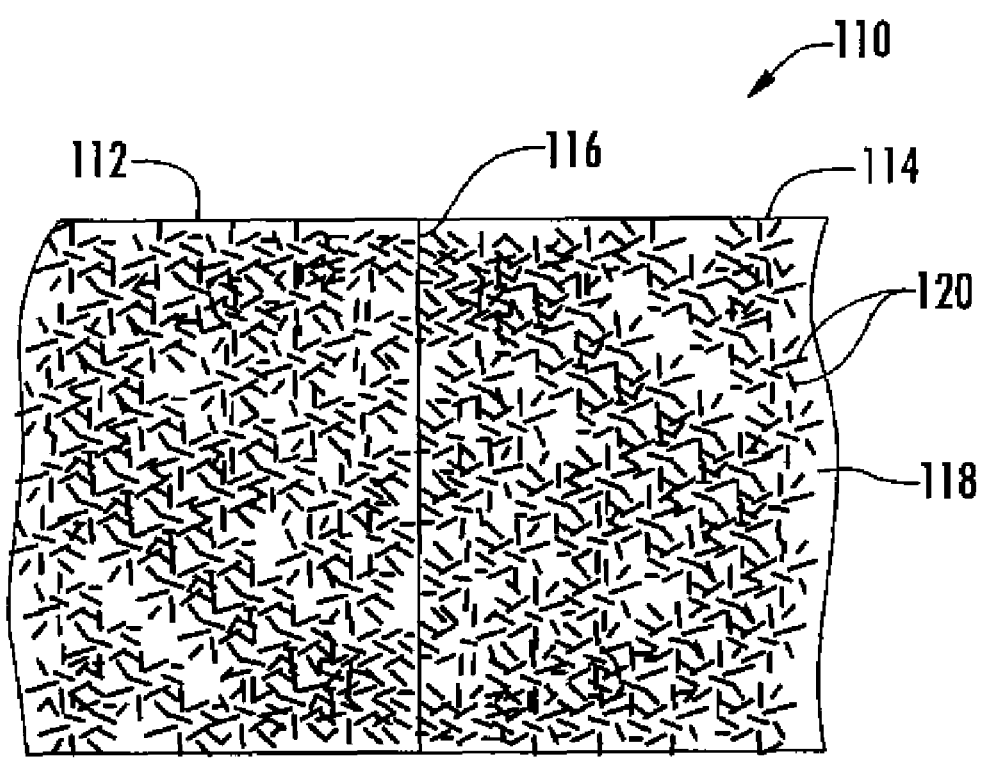
FIG. 4 is a top view of the members of FIG. 3 after a friction stir welding process.

FIGS. 2-4 depict a process of bonding reinforced metal matrix components together in a butt joint using friction stir welding. In this example, first and second members 112 and 114 are bonded together along a joint path 116 to form a completed component 110. The illustrated members 112 and 114 are simple plate-type elements with a constant thickness. However, these are merely representative examples, and the process described herein may be used to join any type of component which is amenable to friction stir welding. Examples of turbine engine components which may be constructed from fiber reinforced metals include rotating fan blades, outlet guide vanes, reverser cascades, and various other static structures. Furthermore, the present method is applicable to joint configurations other than the illustrated butt joint.

Each of the first and second members 112 and 114 comprise a metal matrix 118 with reinforcing fibers 120 disposed therein. In the illustrated example the reinforcing fibers 120 have a random three-dimensional orientation to impart isotropic structural properties to the members 112 and 114, but other orientations could be used to achieve desired properties. The reinforcing fibers 120 are essentially uniformly distributed throughout the volume of each of the members 112 and 114. This distribution can be described as an average volume fraction of fibers for a unit volume of the matrix 118, i.e. a value of 0.0 would represent a total lack of reinforcing fibers 120 within the matrix 118, and a value of 1.0 would represent a solid mass of reinforcing fibers 120.

The metal matrix 118 will vary depending on the requirements of the specific application. One non-limiting example of a metal known to be suitable for structural components is titanium and alloys thereof.

The reinforcing fibers 120 will also vary according to the specific application. The fibers beneficially will have a tensile strength greater than that of the matrix 118 in order to form a synergistic structural combination with the matrix 118. Non-limiting examples of materials useful for reinforcing fibers 120 include silicon coated carbon, silicon carbide, tungsten, glass, other kinds of carbon fibers, and metals. In the illustrated example, the reinforcing fibers 120 have a diameter of about 1 micrometer (40 microinches) to about 25 micrometers (980 microinches), with aspect ratios of about 100 to about 15,000 with resultant lengths of about 1 mm (0.004 in.) to about 38 cm (14.7 in.)

The member 112 is joined to the member 114 using a friction stir welding process. The welding process is carried out using friction stir welding machinery and fixtures of a known type (not shown). As shown in FIG. 2, a cylindrical, shouldered, wear-resistant pin "P" having a tip "R" is rotated and forced against the joint path 116. The friction between the pin P and the members 112 and 114 causes the material to soften and flow without melting. Thus, friction stir welding is a type of solid state bonding process. In the illustrated example the pin P has a shoulder diameter "D" of about 10.7 mm (0.420 in.), and the tip R has a length "l" of about 2.8 mm (0.110 in.) from the shoulder to its distal end and a diameter "d" of about 6.4 mm (0.250 in.), and has a left-hand thread formed thereon. The following exemplary parameters have been found to produce an acceptable friction stir welded bond: pin speed about 700 to about 900 RPM; traversing speed about 10 cm/min. (4 in/min.) to about 15.2 cm/min. (6 in/min.); and force on the pin P about 499 kg (1100 lbs.) to about 635 kg (1400 lbs.). The pin P is traversed along the joint path 116, straddling the member 112 and 114, leaving the members 112 and 114 bonded together behind it.

As the pin P is traversed along the joint line, the heat generated is conducted away from the pin P and to the surface of the members 112 and 114, which results in a decreasing temperature gradient. Along this gradient, various zones can be identified according to the effect on the members 112 and 114. A stir zone "S" is created which has a width slightly greater than the width of the tip R, for example about 0.25 mm (0.010 in.) from the edge of the tip R on each side. A thermomechanically altered zone "T" extends outward from the edge of the stir zone "S", for example about 0.25 mm (0.010 in.) on each side. A heat affected zone "H" extends outward from the edge of the thermomechanically affected zone T, for example about 0.76 mm (0.030 in.) on each side. The width of each of these zones will be affected by the thermal properties of the members 112 and 114, as well as their shape and dimensions.

Within the stir zone S, a vortex spiral circular flow of the matrix 118 is generated around the tip R. Because the matrix 118 is in a fluid state, the reinforcing fibers 120 are free to move with this flow. They are carried around the periphery of the tip R (see FIG. 3). It has been found that reinforcing fibers 120 will tend to align their longitudinal axes parallel to the shear gradient in the material. Thus, they will tend to remain tangent to the vortex flow as they are carried around it. Within the thermomechanically altered zone T, there is reduced transport of the reinforcing fibers 120, but they tend to orient themselves parallel to a moving shear plane normal to the joint path 116. In contrast to prior art types of thermal bonding, the reinforcing fibers 120 will tend to remain within in the vicinity of the joint path 116.

Figure 5:
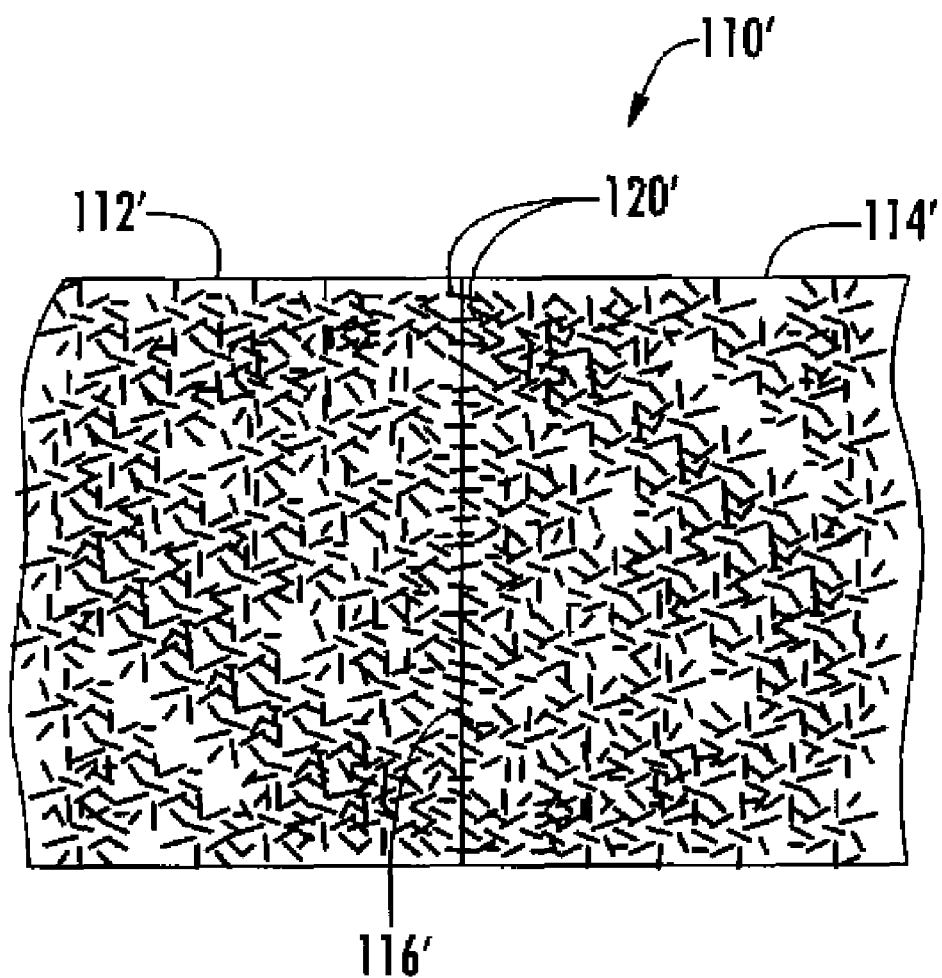
FIG. 5 is top view of the members of FIG. 3 after bonding by an alternative friction stir welding process.

As the probe P traverses the joint line, the stir zone S cools and solidifies, resulting in consolidation between the member 112 and the member 114. Individual fibers 120 will remain in the locations and orientations where the matrix 118 "traps" them during solidification. The friction stir welding parameters can be modified to influence the final orientation of the reinforcing fibers 120. For example, the traversing speed can be increased or decreased relative to the pin speed. A relatively rapid traverse rate will tend to result in reduced transport of the reinforcing fibers 120 across the joint path 116, while a relatively higher traverse rate will result in increased transport of the reinforcing fibers 120 across the joint path 116. Furthermore, higher pin speed or pressure will increase the size of the stir zone S and the thermomechanically altered zone T, tending to increase the amount of transport. FIG. 4 shows the component 110 bonded in such a way that the reinforcing fibers 120 are substantially randomly oriented along the joint path 116. FIG. 5 shows a similar component 110' made from two members 112' and 114' bonded along a joint path 116'. In this example, the reinforcing fibers 120' are more likely to be oriented transverse to the joint path 116'. Such an orientation might be expected from using a relatively low traverse rate.

The completed weld leaves a smooth surface finish along the joint path which requires minimal processing to result in an acceptable finished product. In contrast to prior art thermal bonding methods, there will be a significant distribution of reinforcing fibers 120 within and across the joint path 116, similar to the average fiber volume fraction before bonding. Accordingly, the structural properties of the members 112 and 114 are substantially preserved, and the component will not have a weakness along the joint path 116.

The foregoing has described a process for bonding fiber reinforced metal composites using friction stir welding. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A method of making a fiber-reinforced component, comprising;

providing a rotating friction stir welding tool comprising a cylindrical pin having a shoulder diameter of about 10.7 mm (0.420 in.), and a tip with a length of about 2.8 mm (0.110 in.) and a diameter of about 6.4 mm (0.250 in.) affixed thereto;

providing a first composite member comprising a metal matrix with reinforcing fibers having a diameter of about 1 micrometer (40 microinches) to about 25 micrometers (980 microinches) and a length of about 1 mm (0.004 in.) to about 38 cm (14.7 in.) distributed therein in a selected orientation;

providing a second composite member comprising a metal matrix with reinforcing fibers having a diameter of about 1 micrometer (40 microinches) to about 25 micrometers (980 microinches) and a length of about 1 mm (0.004 in.) to about 38 cm (14.7 in.) distributed therein in a selected orientation; and joining the first composite member to the second composite member by friction stir welding along a predetermined joint path such that an average volume fraction of the reinforcing fibers within the joint path is substantially the same after the step of joining the first composite member to the second composite member by friction stir welding as before the step of joining the first composite member to the second composite member by friction stir welding, wherein the step of joining the first composite member to the second composite member by friction stir welding is performed with a pin speed between about 700 RPM and about 900 RPM, and a traverse speed between about 10 cm/min. (4 in./min.)

and about 15.2 cm/min. (6 in/min.) and a force on the pin between about 499 kg (1100 lbs.) to about 635 kg (1400 lbs.).

2. The method of claim 1 wherein the reinforcing fibers are maintained in the selected orientation within the predetermined joint path after the step of joining the first composite member to the second composite member by friction stir welding.

3. The method of claim 1 wherein the reinforcing fibers are disposed in the first composite member and the second composite member in a random orientation before the step of joining the first composite member to the second composite member by friction stir welding.

4. The method of claim 3 wherein the reinforcing fibers are disposed in a random orientation within the predetermined joint path after the step of joining the first composite member to the second composite member by friction stir welding.

5. The method of claim 4 wherein the reinforcing fibers are disposed in a selected orientation within the predetermined joint path after the step of joining the first composite member to the second composite member by friction stir welding.

6. The method of claim 1 wherein a plurality of the reinforcing fibers extend across the predetermined joint path after the step of joining the first composite member to the second composite member by friction stir welding.

* * * * *